Dec. 16, 1941.　　　　J. J. KALMON　　　　2,266,212
DOUGH MOLDING MACHINE
Filed April 22, 1941　　　2 Sheets-Sheet 1

Inventor
JOSEPH J. KALMON.
By Clarence A. O'Brien
Attorney

Dec. 16, 1941.     J. J. KALMON     2,266,212
DOUGH MOLDING MACHINE
Filed April 22, 1941     2 Sheets-Sheet 2

Inventor
JOSEPH J. KALMON.

By Clarence A. O'Brien
Attorney

Patented Dec. 16, 1941

2,266,212

UNITED STATES PATENT OFFICE 2,266,212

DOUGH MOLDING MACHINE

Joseph J. Kalmon, Medford, Wis.

Application April 22, 1941, Serial No. 389,819

3 Claims. (Cl. 107—9)

This invention relates to dough molding machines, and particularly to that type of dough molding machine generally referred to in the art as a "drum type molding machine."

In accordance with the present invention improved means is provided for mounting the semi-circular compression plate to the end that there will be no dead stop of the dough as it enters the space between the rotating drum and compression plate to be kneaded or worked into proper condition.

A further object of the invention is to so improve upon such types of dough molding machines as above referred to that either light or dark bread may be molded without readjusting the molder to the end that the resulting loaf of bread, in bloom and texture, is less than 50% as compared with the present type of molding machine.

A further object of the invention is to so improve upon drum-type dough molding machines as to effect a material saving in the yeast.

The invention, together with its objects and advantages, will be best understood from a study of the following description taken in connection with the accompanying drawings wherein—

Figure 1:
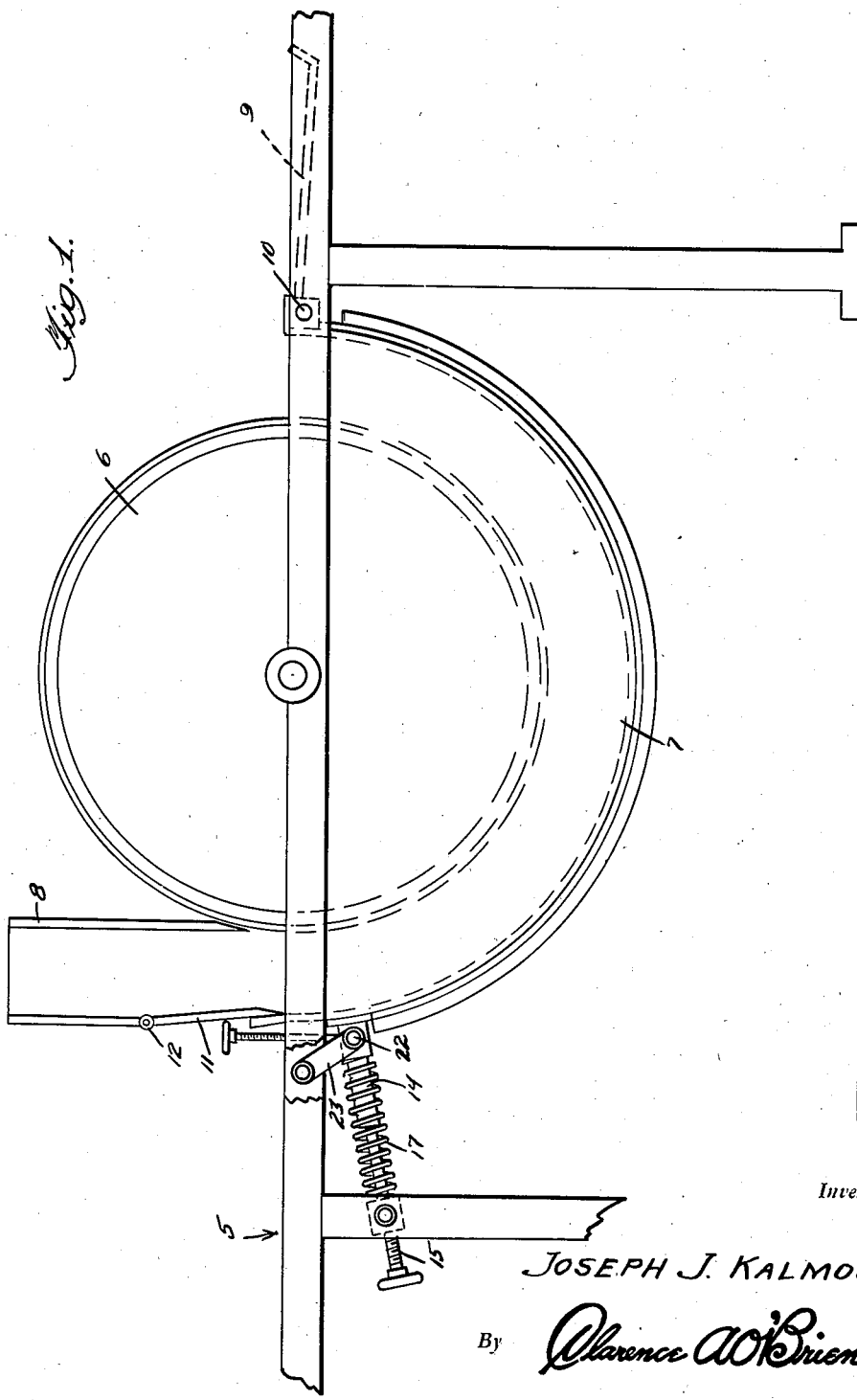
Figure 1 is a fragmentary side elevational view of a drum-type molding machine embodying the features of the present invention.
Figure 2:
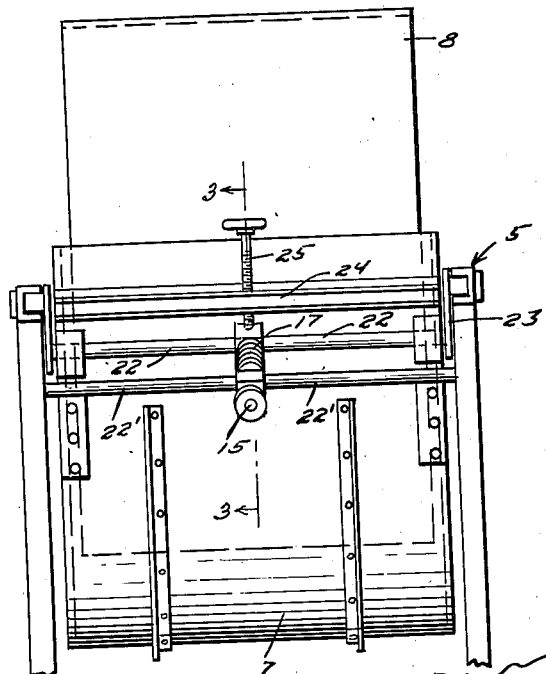
Figure 2 is an end elevational view of the assembly shown in Figure 1.
Figure 3:
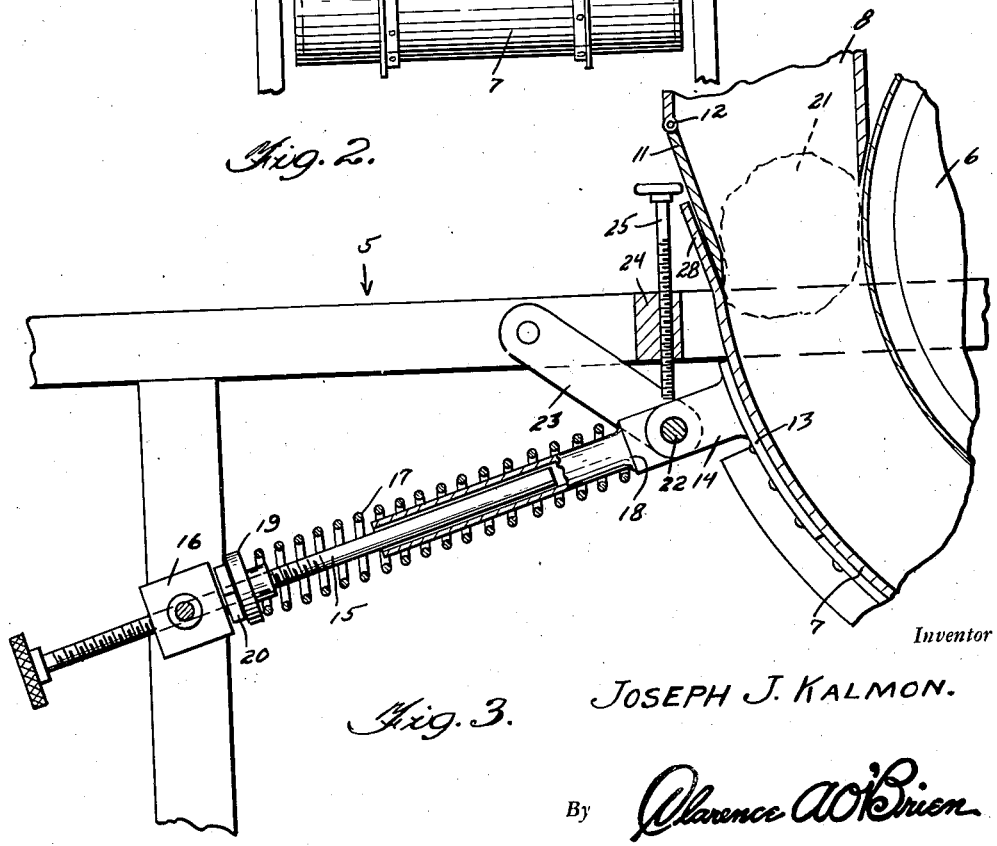
Figure 3 is an enlarged detail sectional view taken substantially on the line 3—3 of Figure 2.

Referring more in detail to the drawings it will be seen that the main frame of the machine is indicated by the reference numeral 5, and, as is somewhat conventional, at one end of this frame there is journaled a kneading drum 6.

A compression plate 7 surrounds the lower half of the kneading drum 6 in spaced relation thereto to form a channel between the drum and the compression plate. The dough to be subjected to the action of the drum 6 and compression plate 7 is deposited by action of gravity into the channel from a vertical discharge chute 8 that aligns with the channel at one end of the compression plate 7 as shown.

After being subjected to the action of the drum 6 and compression plate 7 and thereby worked into condition for panning, the dough is deposited onto a pan 9 suitably provided at that end of the compression plate 7 remote from the discharge chute 8.

In accordance with the present invention the pan 7 may be formed integral with or otherwise suitably provided at said end of the compression plate 7, and at the last-named end thereof the plate 7 is pivoted to the frame 5 as at 10.

In accordance with the present invention the discharge chute 8 at the mouth thereof is provided with a wall section 11 hinged as at 12.

Also in accordance with the present invention the compression plate 7, at the end thereof remote from the hinge 10, has riveted, or otherwise secured thereto a plate 13 formed on one end of a tubular rod 14.

The rod 14 accommodates in the bore thereof a knob-equipped rod 15 that works through a block 16 from opposite sides of which extend elongated pintles 22 that have free ends journaled in opposed standards of the frame 5.

Disposed about the rods 14 and 15 is a coil spring 17 that at one end bears against a suitable shoulder 18 provided therefor on the rod 14 and at an opposite end bears against a spring-tensioned adjusting collar 19 that is threaded on the knob-equipped rod 15.

Also threaded on the knob-equipped rod 15 is a lock-nut 20 that assists in securing the collar 19 at the desired position of adjustment on the rod 15.

From the above it will be seen that the rod 14 is free to shift, against the action of spring 17, longitudinally relative to the rod 15 thus permitting the compression plate 7 to swing on its pivot 10 relative to the kneading drum 6. Consequently, as the mass of dough 21 passes into the channel between the periphery of the drum 6 and the compression plate 7, the compression plate 7 is free to swing away from the drum 6 to the extent required to permit the dough mass 21 to pass easily into the channel. Consequently the dough mass 21 passes, without interruption, directly from the discharge chute 8 into said channel and therefore there will be no stopping up of the dough masses at this point. Consequently the feeding of the successive dough masses will be accomplished with facility and without danger of the molding machine becoming clogged.

Adjacent the ends 13 thereof, the rod 14 has extending from opposite sides thereof pivot rods 22 that at their free ends are connected with the sides of the frame 5 through the medium of links 23.

Also threaded vertically through a cross-bar 24 of the frame 5 is a stop screw 25 that is arranged in the vertical path of the rod 14 and against which the rod will abut incidental to the movement thereof in response to the expansive action of spring 17 forcing the compression plate 7 towards the drum 6. Thus the stop screw 25 will serve to prevent the compression plate 7 from being forced toward the drum 6 a distance greater than desired or intended.

Also at the entrance end of the channel between the drum 6 and the compression plate 7, the wall of the plate 7 is flared as at 28 to accommodate the hinged wall section 11 of the discharge chute 8.

It will thus be seen that the section 11 of the chute 8 will be free to swing in response to a swinging movement of the compression plate 7 and the flared wall portion 28 of the plate 7 will coact with the wall section 11 to maintain, as it were, a closed joint between the dough-receiving channel and the chute 8, at all times, at the point of discharge of the dough from the chute 8 into the channel between the plate 7 and drum 6.

From the foregoing it will be seen that with the compression plate 7 so mounted and supported, it will be free to "give" the amount necessary in order to prevent the dough mass 21 in discharging from the chute 8 into the channel between the drum 6 and the plate 7 from coming to a "dead" stop. As a result, the dough mass 21 will not become jammed between the drum 6 and the compression plate 7 and consequently is not subjected to such "slapping and tearing" action as to tear and break the tissues of the structure of the loaf. Thus is the present invention an advantage over the present drum-type of molders, which are generally characterized by having the compression plate rigidly mounted and consequently the mass of dough passing into the channel between the plate and the kneading drum is sometimes, because of the size of the mass, caught and held between the periphery of the drum and the compression plate at the point of entrance into the channel, and being so held is then subjected to such action referred to as "slapping" that the tissues are torn and the whole structure of the loaf broken down.

It is believed that the simplicity of the invention, together with its many advantages, will be clear to those skilled in the art without further detailed description.

Having thus described the invention what is claimed as new is:

1. In a dough molding machine, and in combination, a kneading drum, a compression plate surrounding a portion of the periphery of said drum in spaced relation relation thereto and forming between the drum and plate a dough-receiving channel, a discharge chute mounted at one end of said channel, means pivotally supporting said compression plate at the end thereof remote from said discharge chute, and a spring-tension device supporting said compression plate at the end thereof adjacent to said discharge chute, said discharge chute at the discharge end thereof having a vertically swinging hinged wall section, and said compression plate at the end thereof near to said chute having a flared portion accommodating the hinged wall section of said chute within the aforementioned channel.

2. In a dough molding machine, a frame, a kneading drum rotatably mounted on the frame, a compression plate surrounding a portion of the periphery of the drum in spaced relation thereto, said compression plate being pivoted at one end thereof to said frame, a tubular rod section secured at one end thereof to the convex side of said compression plate at the end thereof remote from said pivot, a block pivotally mounted on said frame, a rod section having a threaded portion threaded through said block and a free end portion arranged within the bore of said tubular rod, and a spring-tension device associated with said rod sections.

3. In a dough molding machine, a frame, a kneading drum rotatably mounted on the frame, a compression plate surrounding a portion of the periphery of the drum in spaced relation thereto, said compression plate being pivoted at one end thereof to said frame, a tubular rod section secured at one end thereof to the convex side of said compression plate at the end thereof remote from said pivot, a block pivotally mounted on said frame, a rod section having a threaded portion threaded through said block and a free end portion arranged within the bore of said tubular rod, and a spring-tension device associated with said rod sections, and a vertical stop screw threaded through a part of said frame above the tubular rod section and coacting therewith to limit movement of the compression plate inwardly toward the periphery of said kneading drum.

JOSEPH J. KALMON.